United States Patent [19]

Gower et al.

[11] Patent Number: 5,269,447
[45] Date of Patent: Dec. 14, 1993

[54] VEHICULAR CARGO TRAY HAVING MOVABLE DIVIDERS

[75] Inventors: Jerald Gower, Beaverton; Kelly J. Trent, Davison; Gary R. Godwin, Mt. Clemens; Greg B. Reeves, Sterling Heights, all of Mich.

[73] Assignee: Durakon Industries, Inc., Lapeer, Mich.

[21] Appl. No.: 880,735

[22] Filed: May 8, 1992

[51] Int. Cl.$^5$ .............................................. B60R 7/00
[52] U.S. Cl. .................... 224/42.42; 224/42.33; 220/533; 211/184; 206/561; 206/564
[58] Field of Search ............... 224/42.42, 42.32, 42.33; 220/533, 532, 551, 671, 670, 608; 211/184, 11, 10, 43; 206/561, 562, 564

[56] References Cited

U.S. PATENT DOCUMENTS

| | | | |
|---|---|---|---|
| 2,062,802 | 12/1936 | Walker | 211/11 |
| 4,023,682 | 5/1977 | Niece | 211/184 |
| 4,593,816 | 6/1986 | Langenbeck | 220/532 |
| 4,728,158 | 3/1988 | D'Elia et al. | 211/184 |
| 5,054,668 | 10/1991 | Ricchiuti | 224/42.42 |
| 5,094,375 | 3/1992 | Wright | 224/42.42 |

Primary Examiner—Linda J. Sholl
Attorney, Agent, or Firm—Reising, Ethington, Barnard, Perry & Milton

[57] ABSTRACT

An elongated plastic vehicular cargo tray (10) includes a corrugated floor (14), a pair of spaced and corrugated side walls (20, 22), and a pair of end walls (24, 26) forming a truncated box-like structure. A selectively moveable divider device (34) is securely received in the tray (10) to provide lateral support for cargo disposed therein. The divider device (34) includes a bent wire form frame member (52) having first and second tabs (46, 48) for seating within respective grooves (30, 32) formed in the side walls (20, 22) of the tray (10). The frame member (52) also includes first and second hook-like feet (40, 42) for anchoring the divider device (34) to the corrugations (16) in the tray floor (14). The frame member (52) compresses as it is inserted in the tray (10) thus continuously urging the first and second tabs (46, 48) into interlocking engagement with the respective grooves (30, 32) in the side walls (20, 22) to prevent disconnection of the divider device (34) from the tray (10) in the event of a vehicular collision.

35 Claims, 4 Drawing Sheets

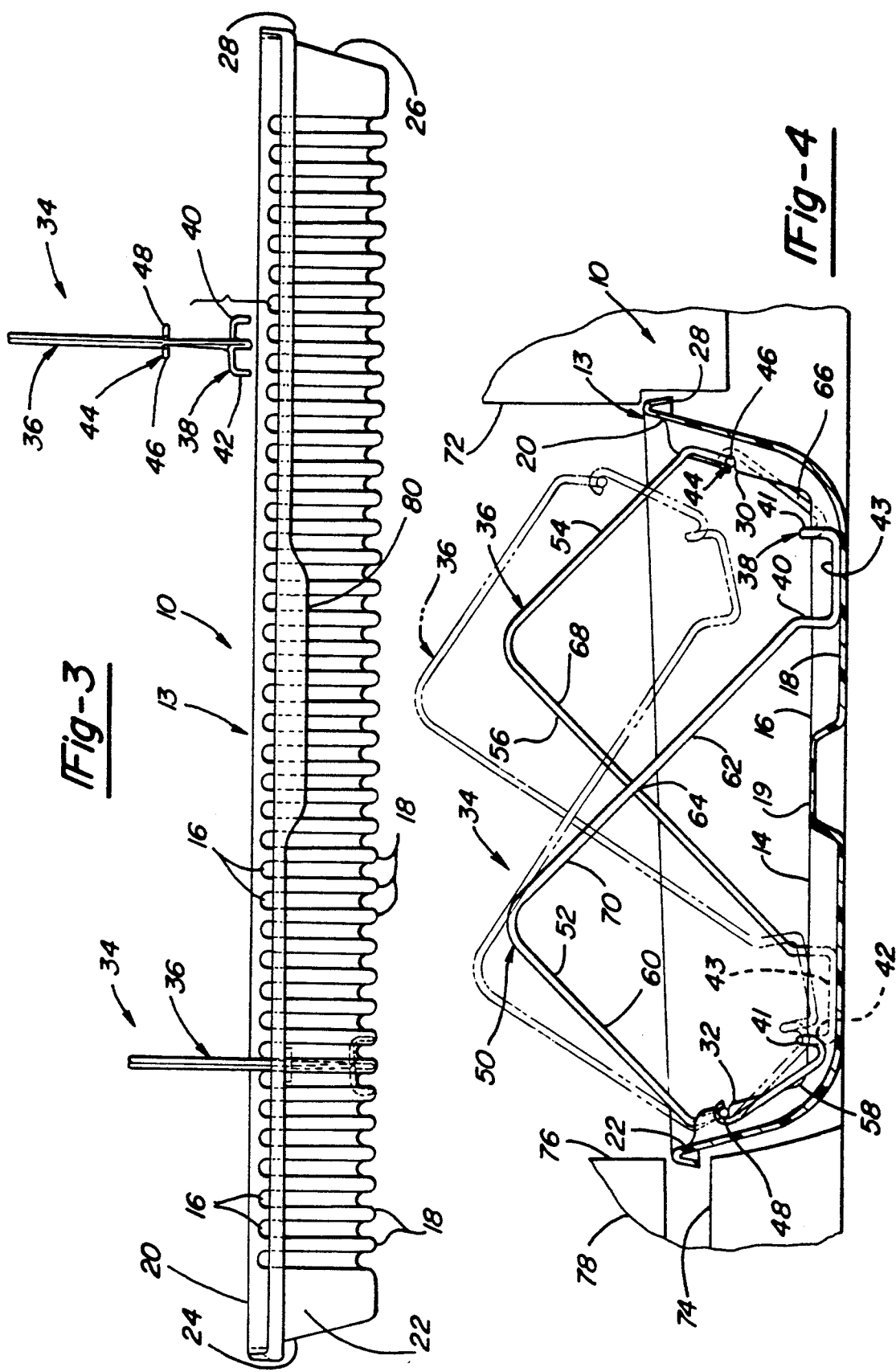

5,269,447

VEHICULAR CARGO TRAY HAVING MOVABLE DIVIDERS

TECHNICAL FIELD

The subject invention relates to a vehicular cargo tray assembly having selectively moveable dividers, and more particularly to a specific divider construction having a bent wire form frame member.

BACKGROUND ART

Nearly all passenger vehicles include some type of cargo compartment or cargo receiving area to make the transportation of cargo safe and convenient. However, because the cargo areas of many vehicles are integrated with the passenger compartment, such as in vans, minivans, and sport/utility vehicles, cargo placed in the cargo receiving area is free to shift during transport thereby damaging the cargo, the vehicle, or even the passenger in the event of a vehicular collision. For example, it is well known that loose objects located in the rear of the vehicle become missile-like projectiles whenever the carrier vehicle is involved in a front end collision. For this reason, it is important that all loose articles in the vehicle be restrained to prevent damage to the cargo itself, the vehicle, or the occupants of the vehicle.

Another problem inherent with transporting cargo is that semi-rigid cargo items, such as groceries contained in a typical plastic or paper sack, are not entirely stable within the vehicular cargo area and often times the contents are spilled as the vehicle turns a corner or makes sudden starts and stops. When this occurs, contents in the grocery bag, such as eggs, milk and flour, and the like, are frequently broken open and spilled within the cargo receiving area.

To alleviate this latter problem, the prior art has taught to form a vehicular cargo tray assembly made of molded plastic for disposition in the vehicular cargo receiving area. Hence, according to the prior art, semi-rigid cargo items such as grocery sacks filled with groceries are received in the vehicular cargo tray. In the event the contents of the grocery sack spill into the cargo tray, the spillage is easily cleaned up by removing the cargo tray from the vehicle and rinsing it out.

One such prior art vehicular cargo tray assembly is shown in U.S. Pat. No. 5,094,375 to Wright, issued May 8, 1992, and assigned to the assignee of the subject invention. The Wright vehicular cargo tray assembly includes a plurality of selectively moveable dividers for dividing the cargo receiving area of the tray assembly. The dividers comprise panel-like members slideable vertically into the valleys formed between adjacent corrugations in the side walls of the tray and thereby providing a rigid divider structure. The primary deficiency of the tray dividers shown in the Wright device arise when the vehicle is involved in a front end collision. As described above, loose objects contained in the vehicle during a vehicular collision typically become projectiles propelled through the passenger compartment by momentum capable of striking and injuring passengers in the automobile. Thus, because the panel-like dividers of Wright are freely slideable out of the tray, the dividers are capable of being dislodged from the tray upon collision and hurled forwardly through the passenger compartment.

SUMMARY OF THE INVENTIONS AND ADVANTAGES

The subject invention provides a removable tray divider device for dividing the cargo receiving area of a vehicular cargo tray having a floor and at least two opposing side walls extending upwardly from the floor. The divider device comprises a divider means for establishing a generally vertical barrier in the tray to prevent the shifting of cargo in the tray, an anchor means for removably anchoring the divider mean to the floor of the tray, and a side wall engagement means spaced upwardly from the anchor means and operatively connected to the divider means for removably engaging the opposing side walls of the tray to maintain the divider means in the vertical orientation while under laterally applied loading. The invention is characterized by a compression means for continuously urging the side wall engagement means outwardly from the divider means into compressive engagement with the respective side walls to prevent disconnection of the device from the tray in the event a vehicular collision.

The subject invention also contemplates a method for fabricating a removable tray divider device for dividing the cargo receiving of a vehicular tray having a floor and at least two opposing side walls. The method comprises the steps of forming a first tab for engaging one side wall of the tray, forming a second tab for engaging the other side wall of the tray, and forming a first foot for anchoring the device to the floor of the tray. The method is characterized by forming a frame member having at least one curved section and interconnecting the first and second tabs and the first foot for creating a resiliency between the first and second tabs so that the first and second tabs are continuously urged into compressive engagement with the respective side walls of the tray to prevent disconnection of the device from the tray in the event of a vehicular collision.

The subject invention overcomes the disadvantages of the prior art by the compression means wherein the side wall engagement means is held in compressive engagement with the opposing side walls of the tray to prevent the divider means from becoming dislodged from the tray in the event the vehicle is involved in a collision. Therefore, the subject invention enhances the safety of vehicular cargo trays by providing a divider means which becomes locked under compression within the tray during use. However, the subject divider means is easily removed and repositioned within the tray by manually overcoming the compression means and relocating the divider device in the tray to properly support semi-rigid cargo such as grocery sacks.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a front elevation view of the vehicular cargo tray assembly and one divider device disposed in an operative position and another divider device removed from the tray assembly;

FIG. 4 is a cross-sectional side view of the subject vehicular cargo tray assembly positioned within the rear cargo area of a passenger van and with the divider device shown in the operative position in solid and in a disengaged position in phantom;

DETAILED DESCRIPTION OF THE PREFERRED EMBODIMENT

Figure 1:
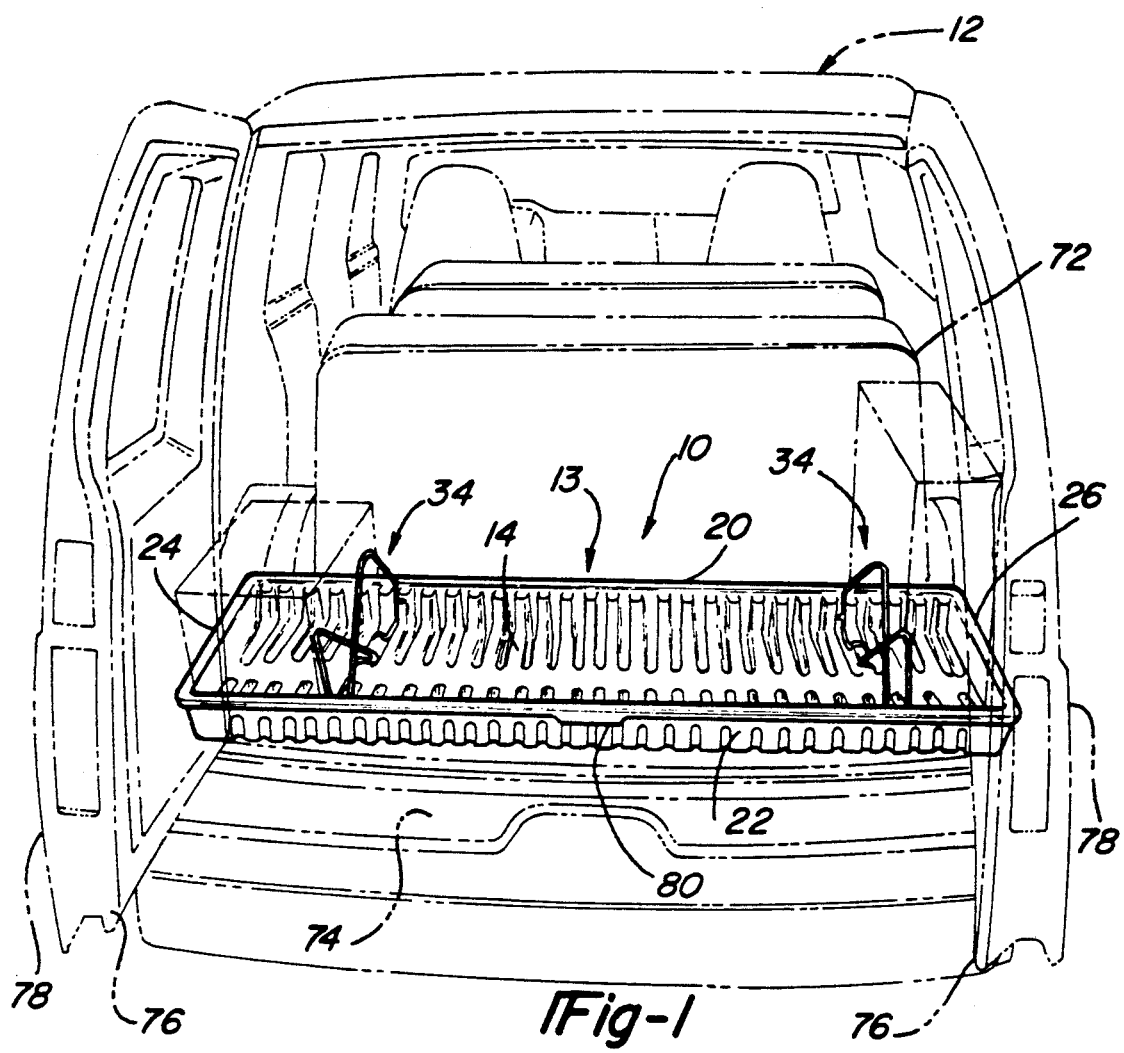
FIG. 1 is a perspective view of the subject vehicular cargo tray assembly and two selectively moveable dividers according to the subject invention and disposed in the phantom rear cargo area of a passenger van.

Referring to the Figures, wherein like numerals indicate like or corresponding parts throughout the several views, a vehicular cargo tray assembly is generally shown at 10 in FIG. 1. The tray assembly 10 is disposed in the cargo carrying area of a vehicle, generally indicated a 12 and shown in phantom in FIG. 1. Preferably, the subject tray assembly 10 is disposed for use in vehicles 12 where the cargo carrying area is open to and integral with the passenger compartment, such as in vans, mini-vans, and sport/utility vehicles. Preferably, the tray assembly 10 spans the entire width and depth of the cargo carrying area and can be fixedly secured to the floor of the vehicle 12 in any common method, such as with threaded fasteners, clips, hook and loop fasteners, or the like. However, as described in detail in connection with FIG. 4 below, the tray assembly 10 is preferably wedged in place within the rear cargo area of the vehicle 12. Because the tray assembly 10 occupies the entire designated cargo carrying area of the vehicle 12, the tray assembly 10 includes a tray means 13 forming a new, self-contained, cargo receiving area for receiving and containing cargo during vehicular transport.

Figure 2:
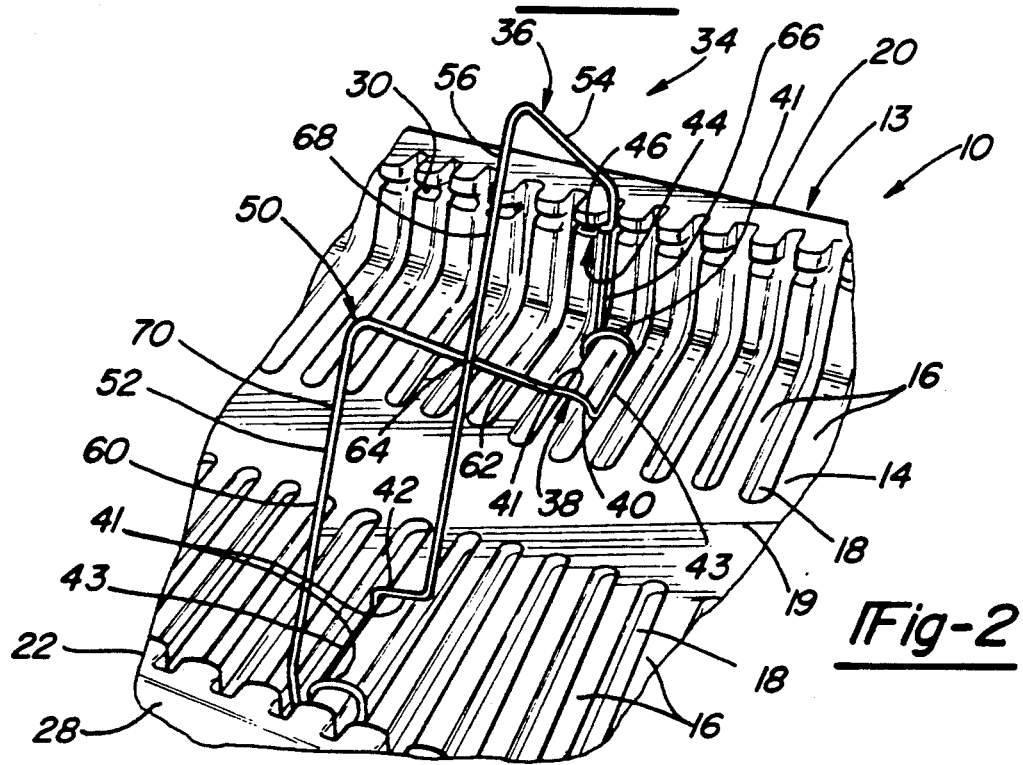
FIG. 2 is a fragmentary perspective view of the subject vehicular cargo assembly and one divider device.

The tray assembly 10 includes a floor 14 having a plurality of equally spaced and parallel corrugations 16 extending widthwise along the length thereof. A valley 18 is formed between adjacent corrugations 16. The valleys 18 and corrugations 16 form a generally sinusoidal cross section, as shown in FIG. 2. A narrow landing 19 may extend lengthwise along the floor 14 and interrupt the corrugations 16. The corrugations 16, valleys 18, and landing 19 are formed so that whenever a liquid is spilled inside the tray means 13, a single valley 18 or group of valleys 18 will contain the entirety of the spilled liquid without spreading over he whole floor 14. Thus, spilled liquid at one end of the tray means 13 will not soil cargo situated at the other end of the tray means 13, because liquid can not migrate from one valley 1 to the next adjacent valley 18 except by passing over the interposed corrugation 16.

A first side wall 20 extends upwardly from the floor 14 adjacent the forward end of the vehicle 12. Likewise, a second side wall 22 is spaced parallel from the first side wall 20 and extends upwardly from the floor 18 adjacent the rearward end of the vehicle 12. A left end wall 24 extends upwardly from the floor 14 and interconnects the left terminal ends of the first 20 and second 22 side walls, as shown in FIG. 1. Similarly, a right end wall 26, spaced parallel from the left side wall 24, extends upwardly from the floor 14 and interconnects the right terminal ends of the first side wall 20 and the second side wall 22. The corrugations 16 and interposed valleys 18 extend perpendicularly from the first side wall 20 and second side wall 22, and parallel to the left end wall 24 and right end wall 26. To increase the rigidity of the side walls 20, 22, the corrugations 16 and corresponding valleys 18 extend in a continuous, aligned fashion from the floor 14 upwardly along each of the first 20 and second 22 side walls. As best shown in FIG. 4, a turned lip 28 extends about the perimeter of the tray assembly 10 along the uppermost edges of the side walls 20 22 and end walls 24, 26. The lip 28 is turned outwardly to present a smooth, functional upper edge of the tray assembly 10, while rigidifying the side walls 20, 22 and end walls 24, 26.

Preferably, the tray assembly 10 is fabricated from a plastic material, such as high density polyethylene. The tray assembly 10 is designed and fabricated to fit snugly within a specific vehicle 12, so that different tray assembly 10 configurations are required for different vehicle types. The integral molding construction of the tray assembly 10 yields a structure devoid of seams so that any liquid or powdery substance spilled within the tray assembly 10 can not leak onto the floor of the vehicle 12. Hence, the tray assembly 10 is particularly effective for receiving and containing cargo during vehicular transport, while preventing damage to the floor or carpeting of the vehicle 12 whenever the cargo contents are spilled within the tray assembly 10.

A receptacle 30, 32 is formed partway up each of the first 20 and second 22 side walls. The receptacles 30, 32, more particularly, each comprise an elongated groove extending horizontally along the respective first 20 and second 22 side walls. The grooves are formed in the portions of the corrugations 16 which extend upwardly along each of the first 20 and second 22 side walls so that the respective grooves are discontinuous in the area of each valley section 18.

A removable tray divider device, generally shown at 34 in FIGS. 1-6, is provided for dividing the cargo receiving area of the tray assembly 10 into sections and for providing lateral support of semi-rigid cargo items, such as grocery sacks, disposed for transport in the tray assembly 10. The device 34 includes a divider means, generally indicated at 36, for establishing a generally vertical barrier in the tray assembly 10 to prevent the shifting of cargo in the tray assembly 10. That is, when disposed in the tray assembly 10, the divider means 36 extends vertically upwardly from the floor 14 and perpendicularly between the first 20 and second 22 side walls, as shown in FIG. 1, to form a bookend-like structure for retaining cargo in its designated place within the tray assembly 10. Therefore, if a slippery item such as a box, or a semi-rigid item such as a grocery sack, is disposed in the tray assembly 10 for transport, the divider means 36 may be selectively positioned in the tray assembly 10 directly adjacent the cargo item so that when the vehicle 12 turns corners or in some other way maneuvers to urge shifting of the cargo within the tray assembly 10, the divider means 36 will resist such laterally applied loading to maintain the cargo item in place and in the tray assembly 10. Of course, as shown in FIGS. 1 and 3, several divider devices 34 may be used in one tray assembly 10.

An anchor means, generally indicated at 38 in FIG. 2, is provided for removably anchoring the divider means 36 to the floor 14 of the tray assembly 10. As will be described in greater detail subsequently, the anchor means 38 is fixedly and integrally connected to the divider means 36 and engages two adjacent corrugations 16 in the tray assembly 10 to help maintain the divider means 36 in the vertical orientation in the tray assembly 10 when lateral loads are applied to the divider means 36 by shifting cargo.

The anchor means 38 includes a first hook-like foot 40 for engaging a corrugation 16 formed in the floor 14 of the tray assembly 10. The anchor means 38 likewise includes a second hook-like foot 42 spaced from the first foot 40 for engaging a corrugation 16 formed in the floor 14 of the tray assembly 10. As shown in FIG. 3, the first foot 40 is laterally offset from the second foot 42 such that adjacent parallel corrugations 14 of the floor 16 are engaged by the respective first foot 40 and second foot 42. As shown by combined reference to FIGS. 2-5, the first foot 40 and second foot 42 are formed by a wire-like structure having a pair of inverted U-shaped segments 41 spaced from one another, which extend over the respective corrugations 16. The inverted U-shaped segments 41 are interconnected by a short straight segment 43 flanking the outside edge of the respective corrugation 16. This specific construction lends substantial stability to the divider means 36 and further allows the divider means 36 to be easily positioned in any desired location within the tray assembly 10.

A side wall engagement means, generally indicated at 44 in FIGS. 1-6, is spaced upwardly from the anchor means 38 and operatively connected to the divider means 36 for removably engaging the two opposing side walls 20, 22 of the tray assembly 10 to maintain the divider means 36 in the vertical orientation while under laterally applied loading. Hence, to resist the moment applied to the divider means 36 by shifting cargo within the tray assembly 10, the side wall engagement means 44 is spaced upwardly from the anchor means 38 to prevent shifting cargo from toppling the divider means 36.

The side wall engagement means 44 includes first 46 and second 48 projecting tabs disposed for mating engagement with the respective first 30 and second 32 receptacles formed in the two opposing first 20 and second 22 side walls of the tray assembly 10. As perhaps best shown in FIGS. 2 and 3, the first 46 and second 48 tabs comprise wire-like structures extending perpendicularly horizontally from the vertical orientation of the divider means 36. That is, the first tab 46 extends horizontally from the divider means 36 and is received in the first receptacle 30, and the second tab 48 extends horizontally from the divider means 36 and is received in the second receptacle 32. To further enhance the support function of the tabs 46, 48, the first tab 46 extends in an opposite horizontal direction relative to the second tab 48. Hence, the first 46 and second 48 tabs extend in opposite horizontal directions.

The subject invention is characterized by including a compression means, generally indicated at 50, for continuously urging the side wall engagement means 44 outwardly from the divider means 36 and into compressive engagement with the respective first 20 and second 22 side walls of the tray assembly 10 to prevent disconnection of the divider device 34 from the tray assembly 10 in the event of a vehicular collision. That is, the compression means 50 forces the first tab 46 and second tab 48 outwardly from the divider means 36 and into continuous compressed engagement with the respective receptacle 30, 32 in the first 20 and second 22 side walls so that the divider device 34 is securely retained within the tray assembly 10 and will not become dislodged from the tray assembly 10 should the vehicle 12 become involved in a collision.

More specifically, the compression means 50 comprises the specific structural characteristics of the divider means 36 which place the entire divider means 36 into compression between the first 46 and second 48 tabs when the device 34 is disposed for operation in the tray assembly 10. Thus, as shown in the Figures, the compression means 50 includes a resilient frame member 52 integral with and forming part of the divider means 36. The frame member 52 includes at least one curved section permitting the frame member 52 to be flexed in spring-like fashion between the first tab 46 and second tab 48. The resiliency of the frame member 52 coupled with the at least one curved section operate to maintain the divider means 36 in a compressed state between the first tab 46 and second tab 48. In other words, the frame member 52 is sprung in position between the side walls 20, 22 so that the frame member 52 acts like a spring continuously biasing the tabs 46, 48 into engagement with the receptacles 30, 32.

Referring to FIG. 4, the frame member 52 is shown including a forward end section 54 extending obliquely upwardly from the first tab 46. A forward crossover section 56 extends obliquely downwardly from the forward end section 54 to the second foot 42. A rearward bottom section 58 extends upwardly from the second foot 42 to the second tab 48. The rearward bottom section 58 terminates in a semi-circular pattern for secure connection to the second tab 48. A rearward end section 60 extends obliquely upwardly from the second tab 48. A rearward crossover section 62 extends obliquely downwardly from the rearward end section 60 to the first foot 40 and intersects the forward crossover section 56 at an intersection 64. And finally, a forward bottom section 66 extends upwardly from the first foot 40 to complete the structure back at the first tab 46. The forward bottom section 66, like the rearward bottom section 58, terminates in a semi-circular pattern for secure connection to the first tab 46.

In an alternative embodiment not shown in the Figures, the tabs 46, 48 are formed from separate pieces of straight wire and bonded to the frame member 52 so that each tab 46, 48 extends horizontally from both sides of the frame member 52. More specifically, the respective bottom sections 58, 66 and associated end sections 60, 54 are bonded together in edge-to-edge fashion independently of the tabs 46, 48. Then, the respective tabs 46, 48 are bonded perpendicularly across the frame member 52 with portions of each tab 46, 48 extending outwardly from each side of the frame member 52 to engage the grooves formed in two adjacent corrugations 16.

Hence, the frame member 52 forms the perfectly symmetrical shape shown in FIG. 4 where the forward crossover section 56 and the rearward crossover section 62 crisscross one other at the intersection 64 forming generally right angles. As shown best in FIGS. 2 and 3, the frame member 52 is entirely disposed within one valley 18 between two adjacent corrugations 16 which are engaged by the respective first foot 40 and second foot 42. And, the forward bottom section 66 and rearward bottom section 58 of the frame member 52 are at least partially disposed within that one valley 18, as shown in FIG. 4.

As described in greater detail below, the entire device 34 is fabricated from first 68 and second 70 wires composed of cold drawn metallic wire sufficiently rigid enough to withstand the foreseeable forces applied during the shifting of cargo disposed in the tray assembly 10. The two wires 68, 70 are bonded together using conventional wire bonding techniques, such as brazing or welding. To prevent corrosion of the first 68 and second 70 wires, a corrosion resistant powder coating is applied over the wires 68, 70, as is known in the art.

Preferably, an electrostatic technique is employed to evenly coat the exterior surfaces of each of the wires 68, 70. Referring again to FIG. 4, the divider device 34 is installed in the tray assembly 10 by first determining which valley 18 comprises an appropriate location in which to adequately secure the cargo disposed in the tray assembly 10. Once the valley 18 is chosen, either the first 46 or second 48 tab is inserted into the corresponding receptacle 30, 32 in the tray assembly 10. As shown by the phantom illustration in FIG. 4, the second tab 48 may be initially located in the second receptacle 32. Next, because the length of the device 34 between the first and second tabs 46, 48 is approximately one half inch larger than the distance between the first 30 and second 32 receptacles, the installer manually applies a compressive force to the frame member 52 compressing the device 34 in compression spring-like manner to enable movement to the position shown in solid in FIG. 4. Because FIG. 4 illustrates initially locating the second tab 48 in the second receptacle 32, the installer must apply a manual compressive force to the frame member 52 in the area of the forward compressive force to the frame member 52 in the area of the forward end section 54. Then, once moved to the solid position of FIG. 4, the installer releases the compressive force and the frame member 52 springs outwardly, thus forcing the first tab 4 into interlocking engagement with the first receptacles 30. Because, as mentioned above, the divider device 34 is approximately one half inch longer than the inside distance between the receptacles 30, 32, the frame member 52 is held in compression effectively locking the first 46 and second 48 tabs in the respective receptacles 30, 32 and thereby preventing disconnection of the device 34 from the tray assembly 10 in the event of a vehicular collision. Removal of the divider device 34 is accomplished by a simple reversal of the installation technique described above.

Figure 5:
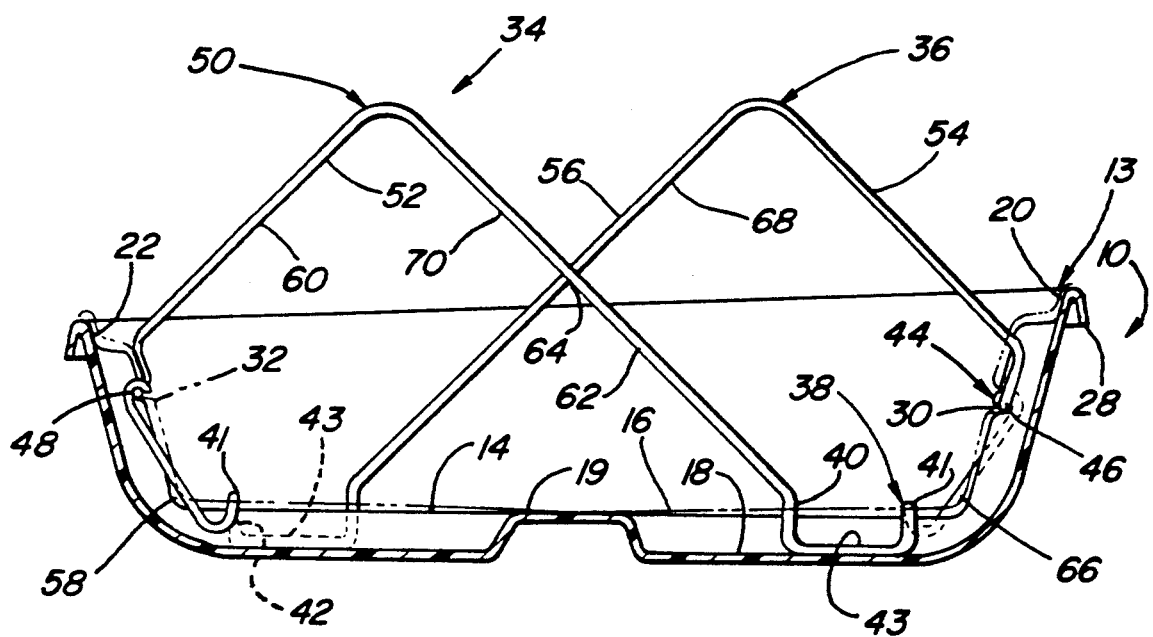
FIG. 5 is a cross-sectional view of the tray assembly as in FIG. 4 showing the inward deflection of the first and second side walls due to a weighted cargo item in phantom.

Referring now to FIGS. 4 and 5, the first side wall 20 of the tray assembly 10 may be formed slightly higher than the second side wall 22 to yield a somewhat slopping effect to the left 24 and right 26 end walls.

This is done to permit the tray assembly 10 to wedge-fit within the rear cargo area of the vehicle 12, between the rearward most seat 72 and the rear scuff plate or step plate 74. In this manner, the tray means 13 is snugly received into the rear cargo area of the vehicle 12 and restrained therein from sliding or shifting movement. To effectively prevent movement of the entire tray assembly 10 in the event of a collision, the lip 28 extending along the second side wall 22 is disposed directly above the scuff plate 74 and captured in placed by the inner trim panel 76 of the vehicular tailgate or rear access doors 78 (shown in phantom in FIG. 1). The lip 28 includes an enlarged handle portion 80 disposed centrally along the second wall 22, as shown in FIG. 3. The handle portion 80 serves a dual function. Firstly, the handle portion 80 provides a convenient location in which to grasp the tray means 13 for insertion in and removal from the vehicle 12. Secondly, the handle portion 80 envelopes an upwardly extending ridge along the scuff plate 74 formed by a recess therein provided (shown in phantom in Figure for the tailgate locking mechanism (not shown).

To further enhance the compression means 50 and operate in concert therewith, the landing 19 forms clamp means for clamping the first 20 and second 22 side walls upon the divider means 36 in response to a cargo weight force received in the tray means 13. That is, the landing 19 forms a central hinge-like member centrally in the floor 14, spaced above the floor of the vehicular cargo area, so that when weighty objects are disposed on the floor 14 of the tray means 13, the first 20 and second 22 side walls deflect inwardly a small amount as shown in phantom in FIG. 5. This inward deflection of the side walls 20, 22 rigidifies the frame member 52 within the tray means 13 so that the heavy cargo item can be more adequately restrained from movement. In other words, and to a certain degree, the heavier the cargo item placed in the tray means 13, the more solidly the frame member 52 becomes clamped between the side walls 20, 22 by way of the landing 19 permitting flexure of the floor 14. The method of wedge-fitting the tray assembly 10 within the vehicular cargo area cooperates with the clamp means to permit such free flexing movement of the side walls 20, 22 as heavy cargo items are received in the tray means 13.

Figure 6:
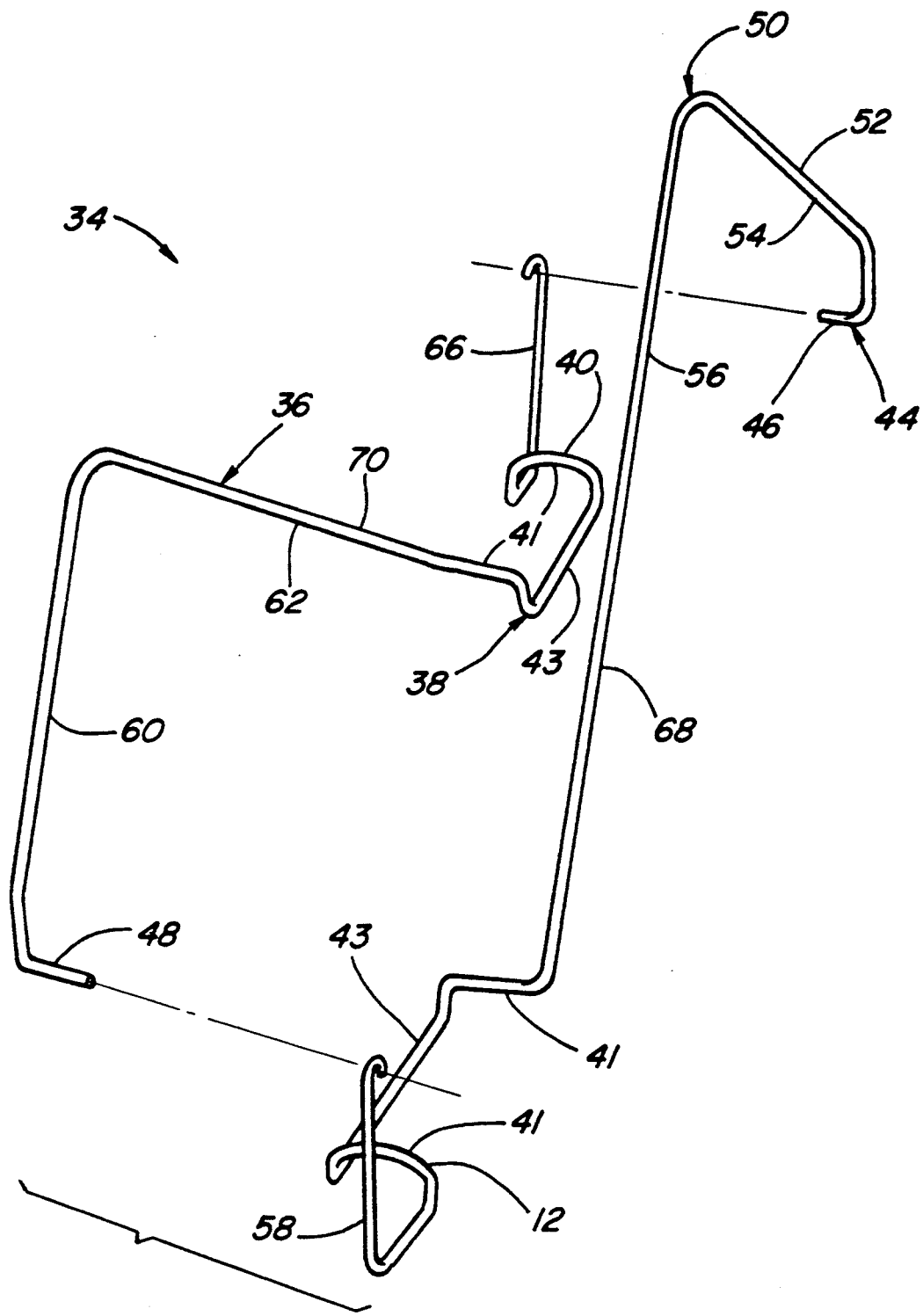
FIG. 6 is an exploded perspective view of the first and second wire forms of the frame member.

Referring now to FIG. 6, the method for fabricating the removable tray divider device 34 will be described. The method comprises the steps of cold drawing a first metallic wire 68 and a second metallic wire 70. Thereafter, a first tab 46 is formed in the first wire 68 for engaging the first side wall 20 of the tray assembly 10. Then, a second tab 48 is formed in the second wire 70 for engaging the second side wall 22 of the tray assembly 10. A first foot 40 is formed on the second wire 70 for anchoring the device 34 to the floor 14 of the tray assembly 10. Likewise, a second foot 42 is formed in the first wire 68 for anchoring the device 34 to the floor 14 of the tray assembly 10. The first 68 and second 70 wires are fixedly coupled together, such as by brazing or welding, to form an operational unit comprising the frame member 52. The invention of the method is characterized by forming the frame member 52 with at least one curved section interconnecting the first 46 and second 48 tabs and the first foot 40 for creating a resiliency between the first 46 and second 48 tabs so that the first 46 and second 48 tabs are continually urged into compressive engagement with the respective side walls 20, 22 of the tray assembly 10 to prevent disconnection of the device 34 from the tray assembly 10 in the event of a vehicular collision.

The frame member 52 is formed as a generally planar member for vertical disposition in the tray assembly 10, extending upwardly from a selected valley 18. As shown best in FIGS. 2 and 3, the first 46 and second 48 tabs are bent perpendicularly horizontally from the vertically oriented frame member 52. The bending of the first 46 and 48 tabs includes bending the first tab 46 and an opposite horizontal direction relative to the second tab 48 to provide additional support to the frame member 52 when laterally loaded by shifting cargo. For the same purpose, the second foot 42 is spaced laterally from the first foot 40 to provide additional stability to the frame member 52. Thus, as shown in FIG. 3, the first foot 40 is disposed on one side of the frame member 52, whereas the second foot 42 is disposed on the other side of the frame member 52, with the first foot 40 and second foot 42 adjoining respective corrugations 16 on opposite sides of the valley 18 aligned with the frame member 52.

The forming of the first wire 68 further includes forming a forward end section 54 in the frame member 52 extending obliquely upwardly from the first tab 46, forming a forward crossover section 56 extending obliquely downward from the forward end section 54 to the second foot 52, and forming a rearward bottom section 58 extending upwardly from the second foot 42. A semi-circular pattern is formed on the end of the rearward bottom section 58 for surrounding the second tab 48. Likewise, the forming of the second wire 70 includes forming a rearward end section 60 extending obliquely upwardly from the second cap 48, forming a rearward crossover section 62 extending obliquely downwardly from the rearward end section 60 to the first foot 40, and forming a forward bottom section 66 extending upwardly from the first foot 40. A semi-circular pattern is formed on the end of the forward bottom section 66 for surrounding the first tab 46. In this manner, it will be appreciated that the first 68 and second 70 wires are formed identically to one another, yet reversed one upon the other to form the structure shown in FIG. 4. The brazing or welding of the first wire 68 to the second wire 70 spoken of above includes bonding the semi-circular pattern of the forward end section 54 to the first tab 46, bonding the semi-circular pattern of the rearward end section 60 to the second tab 48 and bonding the forward crossover section 56 to the rearward crossover section 62 to form the right angle intersection 64 therebetween.

The subject tray assembly 10 and divider device 34 comprise a cargo retaining structure for use in a vehicle 12 which is not only extremely durable and rigid due to the specific structural features described above, but is also inherently safe due to the compression means 50 which continuously urges the first 46 and second 48 tabs into compressed engagement with respective receptacles 30, 32 in the tray assembly 10 to prevent disconnection or dislodgement of the device 34 from the tray assembly 10 in the event of a vehicular collision.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A removable tray divider device (34) for dividing the cargo receiving area of a vehicular cargo tray (10) having a floor (14) and at least two opposing side walls (20, 22) extending upwardly from the floor (14), said device (34) comprising: divider means (36) for establishing a generally vertical barrier in the tray (10) to prevent shifting of cargo in the tray (10); anchor means (38) for removably anchoring said divider means (36) to the floor (14) of the tray (10); side wall engagement means (44) spaced upwardly from said anchor means (38) and operatively connected to said divider means (36) for removably engaging the two opposing side walls (20, 22) of the tray (10) to maintain said divider means (36) in said substantially vertical orientation while under laterally applied loading; and characterized by compression means (50) for continuously urging said side wall engagement means (44) into compressive engagement with the respective side walls (20, 22) of the tray (10) to prevent disconnection of said device (34) from the tray (10) in the event of a vehicular collision.

2. A device as set forth as in claim 1 further characterized by said compression means (50) including a resilient frame member (52) integral with and forming part of said divider means (36).

3. A device as set forth in claim 2 further characterized by frame member (52) including at least one curved section.

4. A device as set forth in claim 2 further characterized by said side wall engagement means (44) including first and second projecting tabs (46, 48) for mating engagement with respective first and second receptacles (30, 32) formed in the two opposing side walls (20, 22) of the tray (10).

5. A device as set forth in claim 4 further characterized by said first and second tabs (46, 48) each extending perpendicularly horizontally from said divider means (36).

6. A device as set forth in claim 5 further characterized by said first tab (46) extending in an opposite horizontal direction relative to said second tab (48).

7. A device as set forth in claim 4 further characterized by said anchor means (38) including a first foot (40) for engaging a corrugation (16) formed in the floor (14) of the tray (10).

8. A device as set forth in claim 7 further characterized by said anchor means (38) including a second foot (42) spaced from said first foot (40) for engaging a corrugation (16) formed in the floor (14) of the tray (10).

9. A device as set forth in claim 8 further characterized by said first foot (40) being laterally offset from said second foot (42) for engaging adjacent parallel corrugations (16) by said respective first foot (40) and said second foot (42).

10. A device as set forth in claim 8 further characterized by said frame member (52) including a forward end second (54) extending obliquely upwardly from said first tab (46), a forward crossover section (56) extending obliquely downwardly from said forward end section (54) to said second foot (42), a rearward bottom section (58) extending upwardly from said second foot (42) to said second tab (48), a rearward end section (60) extending obliquely upwardly from said second tab (48), a rearward crossover section (62) extending downwardly from said rearward en section (60) to first foot (40) and intersecting said forward crossover section (56), and a forward bottom section (66) extending upwardly from said first foot (40) to said first tab (46).

11. A device as set forth in claim 10 further characterized by said forward crossover section (56) and said rearward crossover section (62) intersecting at generally right angles 12. A device as set forth in claim 10 further characterized by said frame member (52), said anchor means (38), and said first and second tabs (46, 48) being fabricated from cold drawn metallic wire.

13. A device as set forth in claim 12 further characterized by said frame member (52) including a corrosion resistant powder coating covering of said wire.

14. A vehicular cargo tray assembly (10) having selectively moveable dividers for dividing a cargo receiving area of the assembly (10), said assembly (10) comprising: tray means (13) for receiving and containing cargo during vehicular transport; said tray means including a floor (14), a first side wall (20) extending upwardly from said floor (14), and a second side wall (22) spaced parallel from said first side wall (20) and extending upwardly from said floor (14); divider means (36) for establishing a generally vertical barrier extending upwardly from said floor (14) and perpendicularly between said first and second side walls (20, 22) to prevent shifting of cargo in said tray means (13); anchor means (38) for removably anchoring said divider means (36) to said floor (14) of said tray means (13); side wall engagement means (44) spaced upwardly from said anchor means (38) and operatively connected to said divider means (36) for removably engaging said first and second side walls (20, 22) of said tray means (13) to maintain said divider means (36) in said vertical orientation while under laterally applied loading; and characterized by compression means (50) for continuously urging said side wall engagement means (44) outwardly from said divider means (36) to compressive engagement with said first and second side walls (20, 22) of said tray means (13) to prevent disconnection of said divider means (36) from said tray means (13) in the event of vehicular collision.

15. An assembly as set forth in claim 14 further characterized by said tray means (36) including side wall engagement means (44) spaced upwardly from said anchor means (38) for removably engaging said first and second side walls (20, 22) of said tray means (13).

16. An assembly as set forth in claim 15 further characterized by said compression means (50) including a resilient frame member (52) integral with and forming part of said divider means (36).

17. An assembly as set forth in claim 16 further characterized by said frame member (52) including at least one curved section.

18. An assembly as set forth in claim 16 further characterized by said first side wall (20) including a first receptacle (30) for receiving said side wall engagement means (44) and said second side wall (22) including a second receptacle (32) for receiving said side wall engagement means (44).

19. An assembly as set forth in claim 18 further characterized by each of said first and second receptacles (30, 32) comprising an elongated groove extending horizontally along said respective first and second side walls (20, 22).

20. An assembly as set forth in claim 19 further characterized by said side wall engagement means (44) including first and second projecting tabs (46, 48) for mating engagement with said respective first and second receptacles (30, 32) formed in said first and second side walls (20, 22).

21. An assembly as set forth in claim 19 further characterized by said first and second tabs (46, 48) extending perpendicularly horizontally from said divider means (36).

22. An assembly as set forth in claim 21 further characterized by said first tab (46) extending in an opposite horizontal direction relative to said second tab (48).

23. An assembly as set forth in claim 19 further characterized by said floor (14) including a plurality of equally spaced parallel corrugations (16) extending perpendicularly between said first and second side walls (20, 22) with corresponding valleys (18) formed between adjacent of said corrugations (16).

24. An assembly as set forth in claim 23 further characterized by said anchor means (38) including a first foot (40) for engaging one of said corrugations (16) formed in said floor (14) of said tray means (13).

25. An assembly as set forth in claim 24 further characterized by said anchor means (38) including a second foot (42) spaced from said first foot (40) for engaging one of said corrugations (16) formed in said floor (14) of said tray means (13).

26. An assembly as set forth in claim 25 further characterized by first foot (40) being laterally offset from said second foot (42) such that adjacent parallel corrugations (16) are engaged by respective first foot (40) and said second foot (42).

27. An assembly as set forth in claim 25 further characterized by said frame member (52) including a forward end section (54) extending obliquely upwardly form said first tab (46), a forward crossover section (56) extending obliquely downwardly from said forward end section (54) and said second foot (42), a rearward bottom section (58) extending upwardly form said second foot (42) to said second tab (48), a rearward end section (60) extending obliquely from said second tab (48), a rearward crossover section (62) extending obliquely downwardly from said rearward end section (60) to said first foot (40) and intersecting said forward cross over section (56), and a forwarded bottom section (66) extending upwardly from said first foot (40) to said first tab (46).

28. An assembly as set forth in claim 27 further characterized by said corrugations (16) and said interposed valleys (18) being disposed in aligned fashion with each of said first and second side walls (20, 22).

29. An assembly as set forth in claim 28 further characterized by said forward bottom section (66) and said rearward bottom section (58) of said frame member (52) being at least partially disposed in one of said valleys (18) in said respective first and second side walls (20, 22).

30. An assembly as set forth in claim 27 further characterized by said forward crossover section (56) and said rearward crossover section (62) intersecting at generally right angles.

31. An assembly as set forth in claim 27 further characterized by said frame member (52), said anchor means (38), and said first and second tabs (46, 48) being fabricated form cold drawn metallic wire.

32. An assembly as set forth in claim 31 further characterized by said tray means (13) being fabricated from plastic.

33. An assembly as set forth in claim 32 further characterized by said frame member (52) including a corrosion resistant powder coating covering said wire (68, 70).

34. A vehicular cargo tray assembly (10) having selectively moveable dividers for dividing a cargo receiving area of the assembly (10), said assembly (10) comprising: tray means (13) for receiving and containing cargo during vehicular transport; said tray means including a floor (14), a first side wall (20) extending upwardly form said floor (14), and a second side wall (22) spaced parallel from said first side wall (20) and extending upwardly from said floor (14); divider means (36) for establishing a generally vertical barrier extending upwardly from said floor 914) and perpendicularly between said first and second side walls (20, 22) to prevent shifting of cargo in said tray means (13); said tray means (13) including clamp means for clamping said first and second side walls (20, 22) upon said divider means (36) in response to a cargo weight force received in said tray mean (13).

35. An assembly as set forth in claim 34 further characterized by said clamp means including a flexible landing (19) formed in said floor (14).

* * * * *

UNITED STATES PATENT AND TRADEMARK OFFICE
CERTIFICATE OF CORRECTION

PATENT NO. : 5,269,447
DATED : December 14, 1993
INVENTOR(S) : Jerald Gower, et al It is certified that error appears in the above-indentified patent and that said Letters Patent is hereby corrected as shown below:

Col. 3, line 54: after "valley" delete "1" and insert --18--

Col. 7, line 34: after "tab" delete "4" and insert --46--

Col. 8, line 1: after "Figure" insert --1)--

Col. 12, line 16: after "upwardly" delete "form" and insert --from--

Col. 11, line 52: after "claim" delete "19" and insert --20--

Col. 11, line 59: after "claim" delete "19" and insert --20--.

Signed and Sealed this

Sixteenth Day of August, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,269,447
DATED : 12/14/93
INVENTOR(S) : Jerald Gower, et al

It is certified that error appears in the above-indentified patent and that said Letters Patent is hereby corrected as shown below:

On the title page, item [73] should read as follows:

--Durakon Industries, Inc. of Lapeer, Michigan and
  Chrysler corporation of Suburn Hills, Michigan--.

Signed and Sealed this

Twentieth Day of June, 1995

Attest:

BRUCE LEHMAN

Attesting Officer       Commissioner of Patents and Trademarks